United States Patent
Swift et al.

(10) Patent No.: US 7,533,907 B2
(45) Date of Patent: May 19, 2009

(54) PRESSURE ACTIVATED DISCONNECT LOCK COUPLING

(75) Inventors: Jonathan C. Swift, Cambridge (GB); Geoffrey R. Keast, Cambs (GB); Timothy G. Robinson, Denver, CO (US); Stephen McGee, St. Neots (GB)

(73) Assignee: The Gates Corporation IP Law Dept., Denver, CO (US)

( * ) Notice: Subject to any disclaimer, the term of this patent is extended or adjusted under 35 U.S.C. 154(b) by 145 days.

(21) Appl. No.: 11/373,849

(22) Filed: Mar. 10, 2006

(65) Prior Publication Data
US 2007/0001450 A1     Jan. 4, 2007

Related U.S. Application Data

(60) Provisional application No. 60/660,894, filed on Mar. 11, 2005, provisional application No. 60/660,971, filed on Mar. 11, 2005.

(51) Int. Cl.
*F16L 19/065* (2006.01)
*F16L 37/088* (2006.01)

(52) U.S. Cl. .................. 285/321; 285/82; 285/339; 285/341

(58) Field of Classification Search ............... 285/33, 285/39, 104, 105, 307, 308, 321, 339, 340, 285/341, 108
See application file for complete search history.

(56) References Cited

U.S. PATENT DOCUMENTS

| | | | | | |
|---|---|---|---|---|---|
| 2,935,343 | A | * | 5/1960 | Ellis | 285/95 |
| 3,718,350 | A | * | 2/1973 | Klein | 285/39 |
| 3,773,360 | A | * | 11/1973 | Timbers | 285/307 |
| 4,063,760 | A | * | 12/1977 | Moreiras | 285/242 |
| 4,087,120 | A | * | 5/1978 | Rumble | 285/39 |
| 4,097,074 | A | * | 6/1978 | Nagao et al. | 285/231 |
| 4,296,953 | A | * | 10/1981 | Nagao et al. | 285/302 |
| 4,564,221 | A | * | 1/1986 | Ishii | 285/239 |
| 4,603,886 | A | * | 8/1986 | Pallini et al. | 285/24 |
| 4,643,466 | A | * | 2/1987 | Conner et al. | 285/321 |
| 4,934,742 | A | | 6/1990 | Williamson | |
| 4,936,544 | A | | 6/1990 | Bartholomew | |
| 5,076,616 | A | | 12/1991 | Williamson | |
| 5,115,550 | A | | 5/1992 | Williamson | |
| 5,197,769 | A | | 3/1993 | Williamson | |
| 5,259,650 | A | * | 11/1993 | Gnauert et al. | 285/39 |
| 5,358,168 | A | | 10/1994 | Williamson | |
| 5,439,257 | A | | 8/1995 | Williamson | |

(Continued)

OTHER PUBLICATIONS

International Preliminary Report on Patentability on corresponding patent application PCT/US06/08621 dated Nov. 15, 2007, 7pages.

(Continued)

*Primary Examiner*—James M Hewitt
(74) *Attorney, Agent, or Firm*—J. L. Mahurin, Esq.; J. A. Thurnau, Esq.; P. N. Dunlap, Esq.

(57) ABSTRACT

A coupling assembly includes a female coupler selectively interconnected to a male coupler to provide sealing engagement. In one embodiment, the female coupler and the male coupler are secured together by a pressure activated locking assembly which prevents disengagement of the male and female coupling until the internal pressure in the coupling is reduced to a predetermined level.

21 Claims, 6 Drawing Sheets

U.S. PATENT DOCUMENTS

| | | | |
|---|---|---|---|
| 5,516,156 | A | 5/1996 | Williamson |
| 5,516,157 | A | 5/1996 | Williamson |
| 5,533,764 | A | 7/1996 | Williamson |
| 5,533,765 | A | 7/1996 | Williamson et al. |
| 5,813,705 | A * | 9/1998 | Dole .......................... 285/321 |
| 5,934,709 | A | 8/1999 | Morrison |
| 6,129,390 | A * | 10/2000 | Ohlsson ...................... 285/39 |
| 6,186,557 | B1 | 2/2001 | Funk |
| 6,530,604 | B1 | 3/2003 | Luft et al. |
| 6,604,760 | B2 | 8/2003 | Cresswell et al. |
| 6,637,781 | B1 | 10/2003 | Seymour |
| 6,682,107 | B2 * | 1/2004 | Munk et al. ................. 285/309 |
| 6,964,435 | B2 * | 11/2005 | Wolf et al. ................... 285/39 |
| 2003/0155763 | A1 * | 8/2003 | Wolf et al. ................... 285/39 |
| 2006/0012171 | A1 * | 1/2006 | Le Quere .................... 285/321 |
| 2006/0061097 | A1 * | 3/2006 | Swift et al. ................. 285/321 |
| 2007/0145742 | A1 * | 6/2007 | Swift et al. ................. 285/321 |

OTHER PUBLICATIONS

Written Opinion of International Searching Authority on corresponding patent application PCT/US06/08621 dated Sep. 21, 2007, 6 pages.

International Search Report on corresponding patent application PCT/US06/08621 dated Sep. 21, 2007, 3 pages.

Swagelok "Quick-Connects" Catalog, Aug. 2005 (believed to be published as early as 1996), 12 pages.

\* cited by examiner

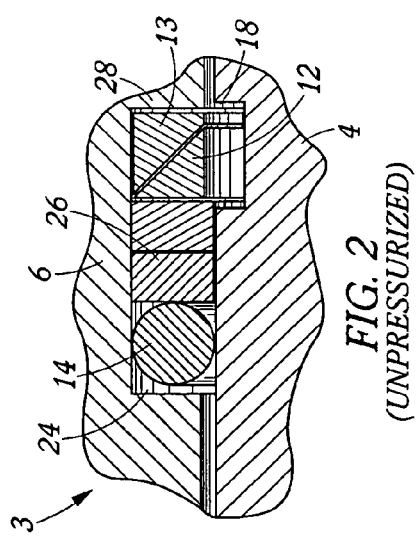
FIG. 2 (UNPRESSURIZED)
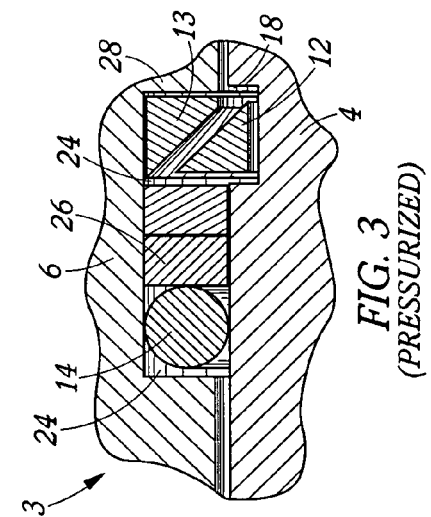
FIG. 3 (PRESSURIZED)
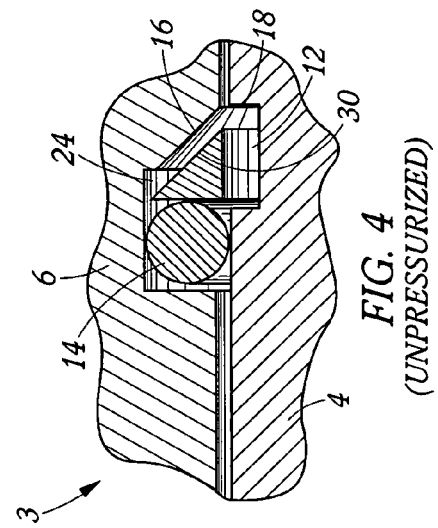
FIG. 4 (UNPRESSURIZED)

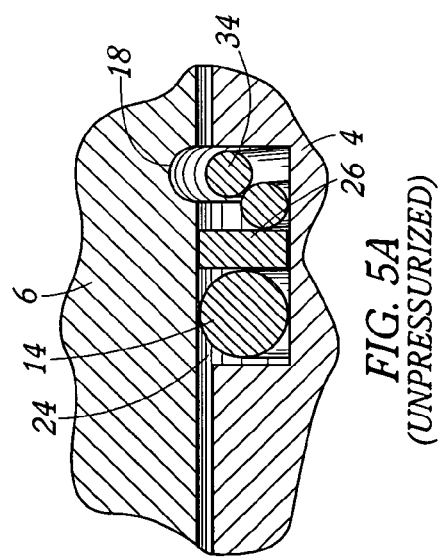
FIG. 5A (UNPRESSURIZED)
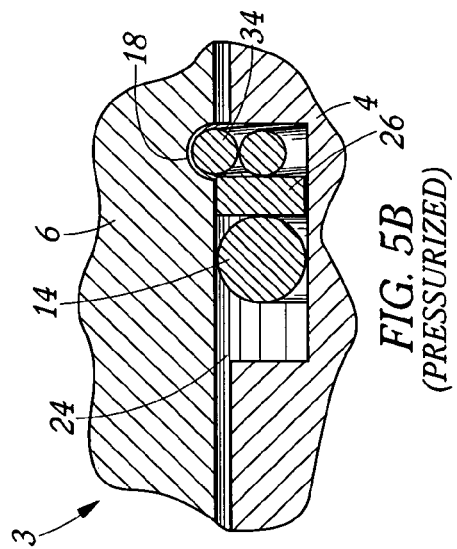
FIG. 5B (PRESSURIZED)
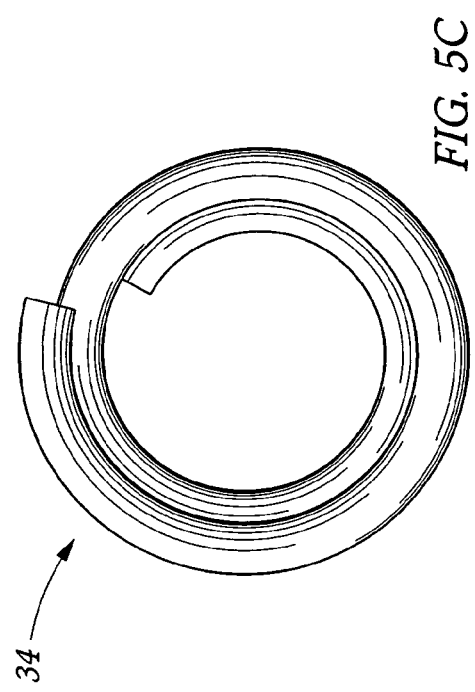
FIG. 5C

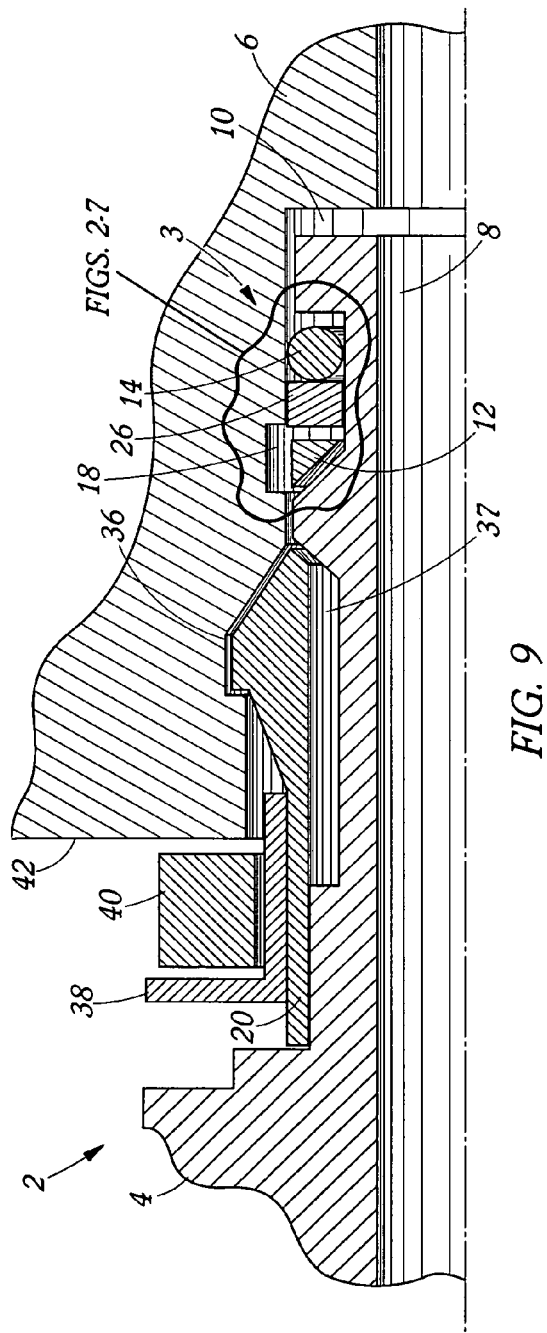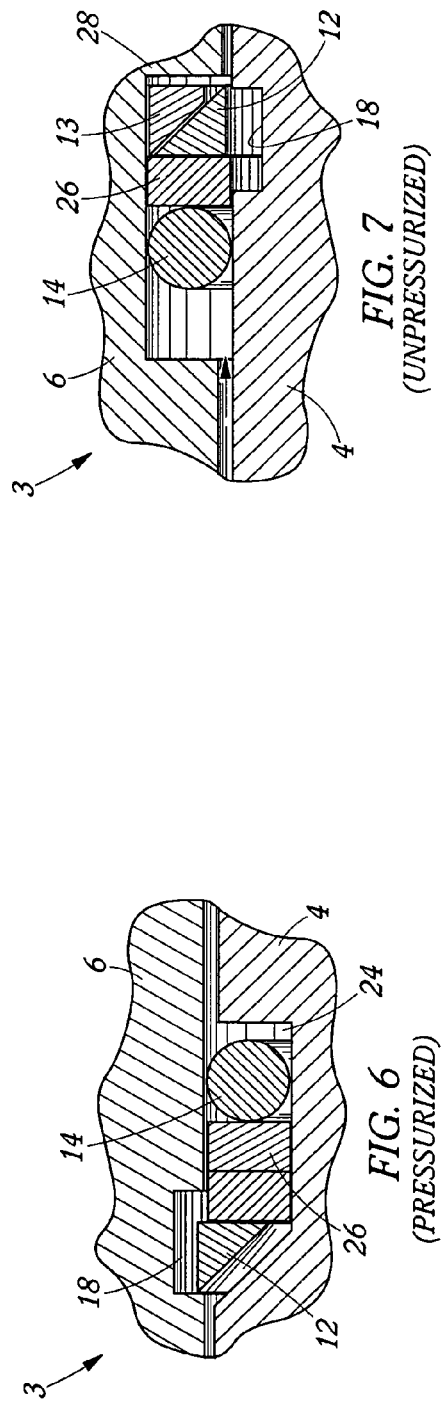

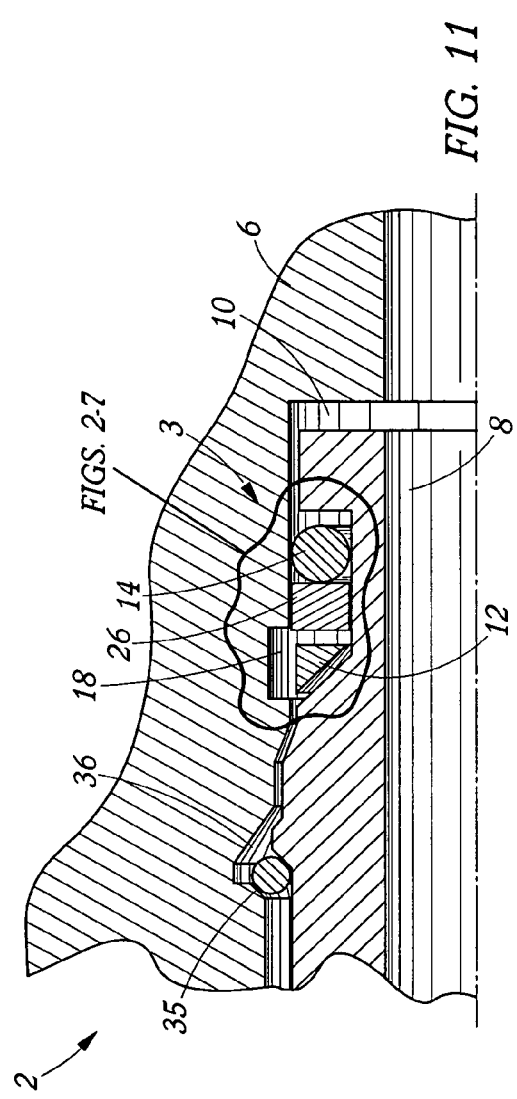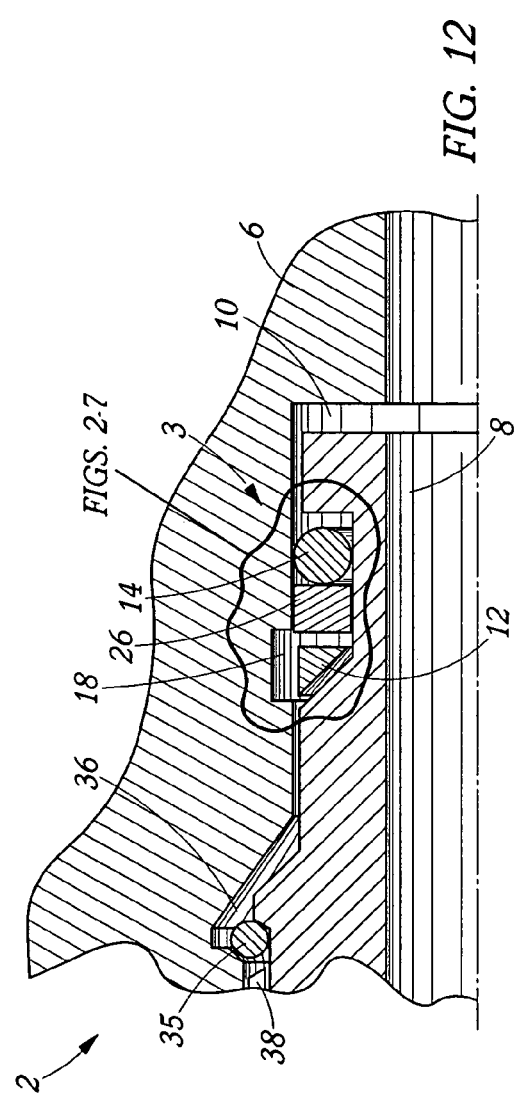

PRESSURE ACTIVATED DISCONNECT LOCK COUPLING

This patent application claims the benefit of U.S. Provisional Patent Application Ser. Nos. 60/660,894 and 60/660,971, both filed Mar. 11, 2005, which are incorporated by reference in their entirety herein.

FIELD OF THE INVENTION

The present invention relates generally to couplings that can be selectively connected and disconnected without the need of tools. More specifically, the invention relates to a quick connect coupling assembly that substantially prevents disengagement of a male portion and a female portion when the coupling is exposed to internal pressure.

BACKGROUND OF THE INVENTION

Quick connect hydraulic couplings typically include a male portion in operable engagement with a female portion. The male and female portions may be interconnected to a hydraulic hose, tubing, piping, machinery or open apparatus that utilizes internal pressure. Since many of these hydraulic hoses and interconnecting machinery utilize high pressure fluids, safety and operational considerations are paramount since an inadvertent disconnection of the coupling may result in serious injury or system failure. Such quick connect couplings are particularly desirable when the hose must be connected in a location that is not readily accessible since it eliminates the need for engaging a threaded connection and the associated danger of cross threading. Further, quick connect couplings generally eliminate the need for specific tools that might not fit in an available space proximate to the connection.

Historically, criteria that have driven the design of quick connect couplings have included the complexity and reliability of the male portion and female portion, and inherent manufacturing concerns which affect the complexity and location of the sealing elements such as o-rings or other seals. The location of safety locking components such as clips, ferrules and clamps have also greatly affected the cost and reliability of quick connect couplings, which further impact their economic viability.

It has also been critical that quick connect couplings are designed for safe and reliable use. Obviously, one of the primary objections is to provide a durable, leak-free connection. However, over time increasing emphasis has been placed upon safety. The quick connect characteristic of such couplings necessarily give rise to a greater risk of inadvertent and sudden disconnects, which may translate to catastrophic failure of the system or injury. This is particularly evident in environments where use of such couplings is generally appealing. These include industrial or heavy machinery operations where installations of fluid connections are numerous, dense, and almost inaccessible. Unexpected impacts or continuous vibrational loads upon quick connect couplings during normal operations or maintenance may increase the likelihood of inadvertent disconnects. Further, inadvertent disconnects on pressurized systems can lead to damaged or broken machinery, destroyed premises, loss of mission, severe injuries and even death.

In general, the male portion of a quick connect coupling typically includes a hose insert portion and a ferrule that is attached to an open end of the hose. The ferrule is then compressed about the hose that is positioned around the hose insert causing it to be permanently affixed. Merely pressing a stem of the male portion into the female portion, or similarly configured port, subsequently completes a flow path for a liquid or gas such as compressed air. Generally, the female portion, or port adapter, is threaded into place in a pre-assembly operation, or alternatively, is machined directly into then associated fixture, machine, or equipment. Thus, it is easy to ensure that the port is properly sized to receive the male portion.

Quick connect couplings have numerous uses and applications, including aerospace, automotive, construction, farming, etc. Generally, where there is a need for continuous connection and subsequent disconnection of fluid or gas lines, or the location of the intended connection makes it difficult or impossible to access, such that a threaded interconnection would be infeasible, a quick connect is ideal.

In operation, the male portion is typically provided with a groove for the receipt of a locking device. Generally, the locking device is a wedging ring that comprises a cylindrical member with an inner and outer diameter. The wedging ring includes a gap such that it is capable of resilient deflection to form a ring of smaller diameter. In some embodiments of the prior art such as the QC series sold be Swagelok®, the wedging ring is placed over a groove integrated into the outer diameter of the male portion. After insertion of the male portion into the female portion, a ring deflecting mechanism or sleeve is forced over the wedging ring, thereby deforming it into a groove located in the male portion to prevent disconnection. The sleeve is held in place over the wedging ring by a spring. To disconnect the two components, the sleeve is pulled towards the spring, thus releasing the wedging ring from the groove and allowing the two portions to be disengaged.

One drawback with prior art quick connect couplings is that the biasing means or spring that maintains the sleeve in the proper location may become worn over time such that the spring force acting upon the sleeve may be reduced allowing the sleeve to be more easily inadvertently displaced, thereby allowing the wedging ring to return to its nominal state and allow the coupling to disengage. Some prior art couplings have addressed this problem by adding a secondary locking device that resides between the sleeve and a protrusion, or bearing surface, situated on the male portion to prevent the sleeve from moving without initially removing the secondary locking device. However, these secondary locking devices are often bulky, occupy excessive space, and require additional steps for disconnection of the male portion and female portion of the coupling. In addition, outside influences such as component vibration may cause secondary locking devices to become dislodged from the quick connect, thereby allowing the locking mechanism to move and become disconnected. Further, prior art couplings generally do not prevent an intentional but inappropriate disconnection.

Another example of a quick connect coupling may be found in U.S. Pat. No. 6,637,781 to Seymour, which is incorporated by reference in its entirety herein. Seymour teaches a quick connect system that utilizes a male portion and a female portion that selectively interconnect. The male portion is adapted to receive a sealing device, such as an o-ring, and a resiliently deflectable wedging ring. Upon insertion of the male portion into the female portion, the wedging ring will selectively deflect and engage grooves in both portions to lock the system together. A spacer is positioned between bearing surfaces on each of the portions to prevent further insertion of the male portion into the female portion. To disconnect the coupling, a user removes the spacer from the coupling, thus allowing the male portion to be inserted further into the female portion, thus repositioning the wedging ring on the stem of the male portion. Once the wedging ring reaches a certain point on the stem, it deflects back to its nominal shape, thus allowing the male portion to be removed from the female portion. The wedging ring must then be removed from the female portion before the coupling may be used again. Thus, the interconnection and disconnection of the prior art coupling is complicated. The quick connect coupling disclosed in Seymour requires an additional component, or stop member, to ensure the coupling does not inadvertently disconnect. The complexity and additional components generally increase the cost to manufacture the coupling, and limits the application of the quick connect coupling to apparatus which do not have space limitations. Once again, this design does not prevent intentional and inappropriate disconnection when the hydraulic system is pressurized.

Thus, there is a long felt need for a quick connect coupling which may be disconnected under pressure, but which may be selectively interconnected and disconnected without the use of accessory tools or other cumbersome devices when pressure is released.

SUMMARY OF THE INVENTION

The present invention substantially meets the aforementioned needs of the industry and limitations of the prior art. One embodiment of the present invention provides a quick connect coupling that utilizes the internal fluid pressure to deform a wedging ring into a groove on either a male portion or a female portion of the coupling, thus locking the portions together and stabilizing the coupling until the internal pressure is released. Such an embodiment may include the male portion for selective interconnection with the female portion, and which is retained in a locked position by a pressure activated wedging ring. The engagement and disengagement noted above is generally achieved without the use of tools to ensure that the system remains locked. In one embodiment, a pressure activated wedging ring is provided which substantially prevents disengagement of the male portion from the female portion when the coupling is internally pressurized. More specifically, embodiments of the present invention utilize the internal pressure of the system to deform the wedging ring. The wedging ring may either decrease or increase in diameter to seat into a groove located in the female portion of the coupler or into a groove in the male portion of the coupler, thus preventing removal of the two portions of the coupling when pressure is introduced into the system. One skilled in the art will appreciate that the wedging ring is fabricated from resiliently deflectable materials, the selection of which will dictate the amount of pressure required for deflection and the extent of deflection. It is thus an aspect of the present invention to provide a quick connect hose coupling with an improvement in safety while retaining the economical and functional benefits of quick connect couplings.

It is another aspect of the present invention to provide a coupler that includes a male coupling portion and a female coupling portion. The female portion generally interconnects to a fixed port, or adapter for engagement with a port, such as a commonly known hexhead fluid boss. The male portion interconnects generally to a flexible fluid line, and selectively interconnects with the female portion. The female portion in one embodiment also includes a locking device such that the coupler cannot be disconnected when the system is internally pressurized. The present invention is generally interconnected without the need of tools such as wrenches or auxiliary external locking devices. In addition, the coupled system decreases the chance of a hydraulic hose kinking because the coupled portions may generally be rotated with respect to each other while remaining locked.

One embodiment of the present invention utilizes a widened seal groove machined into the stem of the male portion of the coupling. The seal groove receives a seal that ensures that a leak free interconnection is maintained. The wedging ring is placed adjacent to the seal. Once the two portions are interconnected and pressure is introduced, pressurized fluid acts upon the seal, forcing the seal against the wedging ring and forcing the wedging ring against an angular surface machined into the seal groove, or alternatively provided by a secondary component. The angular surface transforms the axial force generated by the pressurized seal into axial and radial components. The radial component provides the force required to deflect the wedging ring into a locking groove in the opposite side of the coupler, in this example the female portion. Thus, the coupler cannot be disconnected when it is pressurized.

Although a wedging ring in conjunction with a widened seal groove is described herein, one skilled in the art will appreciate that other pressure-activated locking devices may be employed. For example, one embodiment of the present invention utilizes at least one deflectable key that resides in a channel. Pressure imparted on a single key would deflect the key into a locking cavity or annular channel in the opposite portion to lock the coupling.

It is still yet another aspect of the present invention to provide a coupling that includes a secondary locking device. More specifically, one embodiment of the present invention includes a secondary locking device that is generally used in quick connects of the art as described above. One locking device that may be employed is a cylindrical member situated about the male portion that deforms when the two portions are engaged. Once the two portions are in place, the member returns to its nominal position wherein a section thereof is seated into a groove machined into the female portion of the coupler. Thus, the secondary locking device mechanically locks the two portions together. One skilled in the art will appreciate that many types of secondary locking devices and methods may be used without departing from the scope of the invention. A combination of a secondary lock based on mechanical connections, and a primary lock based on pneumatic and hydraulic fluid pressure ensures the system will not disconnect even when the coupler is unpressurized.

It is yet another aspect of the present invention to provide a coupling that is generally comprised of commonly known materials. More specifically, the wedging ring of one embodiment of the present invention is a resiliently deflectable material comprised of steel, aluminum, silicone, or combinations thereof. The wedging ring is generally placed in a widened seal groove that is located in the male portion or female portion of the coupling. Seal grooves of existing couplings may be easily retrofitted by minimal machining operations to accommodate the pressure activated wedging ring and associated angled surface that is used for deflection purposes. Thus, it is one aspect of the present invention to provide a quick connect coupling with a pressure activated locking assembly which generally comprises:

a male coupling having an insert;

a female coupling having a receiver defined therein which is adapted to receive at least a portion of said insert;

a locking cavity positioned in at least one of said male coupling and said female coupling; and a pressure activated locking device for interaction with at least one of said female coupling and said male coupling that deflects when said quick connect coupling is pressurized, wherein disconnection of said male coupling and said female coupling is substantially prevented until a release of a predetermined amount of pressure, preferably, said male coupling is thereby stabilized relative to said female coupling when said quick connect is pressurized.

The Summary of the Invention is neither intended nor should be construed as being representative of the full extent and scope of the present invention. The present invention is set forth in various levels of detail in the Summary of the Invention as well as in the attached drawings and the Detailed Description and no limitation as to the scope of the present invention is intended by either the inclusion or exclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

FIG. 2 is a cross-sectional front elevation view of one embodiment of a pressure-activated locking device of the present invention in a non-pressurized state;

FIG. 3 is a cross-sectional front elevation view of the pressure-activated locking device shown in FIG. 2 in a pressurized state;

FIG. 4 is a cross-sectional front elevation view of an alternate embodiment of the present invention shown in a non-pressurized state;

FIG. 5A is a cross-sectional front elevation view of an alternate embodiment of the pressure activated locking device shown in a non-pressurized state;

FIG. 5B is a cross-sectional front elevation view of the embodiment shown in FIG. 5A in a pressurized state;

FIG. 5C is a front elevation view of a conical coiled spring that is employed in the embodiment of FIGS. 5A and 5B;

FIG. 6 is a cross-sectional front elevation view of an alternate embodiment of the present invention shown in a pressurized state;

FIG. 7 is a cross-sectional front elevation view of an alternate embodiment of the present invention similar to that shown in FIG. 1 shown in a non-pressurized state;

FIG. 9 is a cross-sectional front elevation view of a coupler that employs the present invention along with a traditional locking device;

FIG. 11 is a cross-sectional front elevation view of a coupler comprising the present invention, similar to that shown in FIG. 9, with a traditional locking device of an alternate design; and FIG. 12 is a cross-sectional front elevation view of a coupler comprising the present invention, similar to that shown in FIG. 9, with a traditional locking device of an alternate design.

Figure 1:
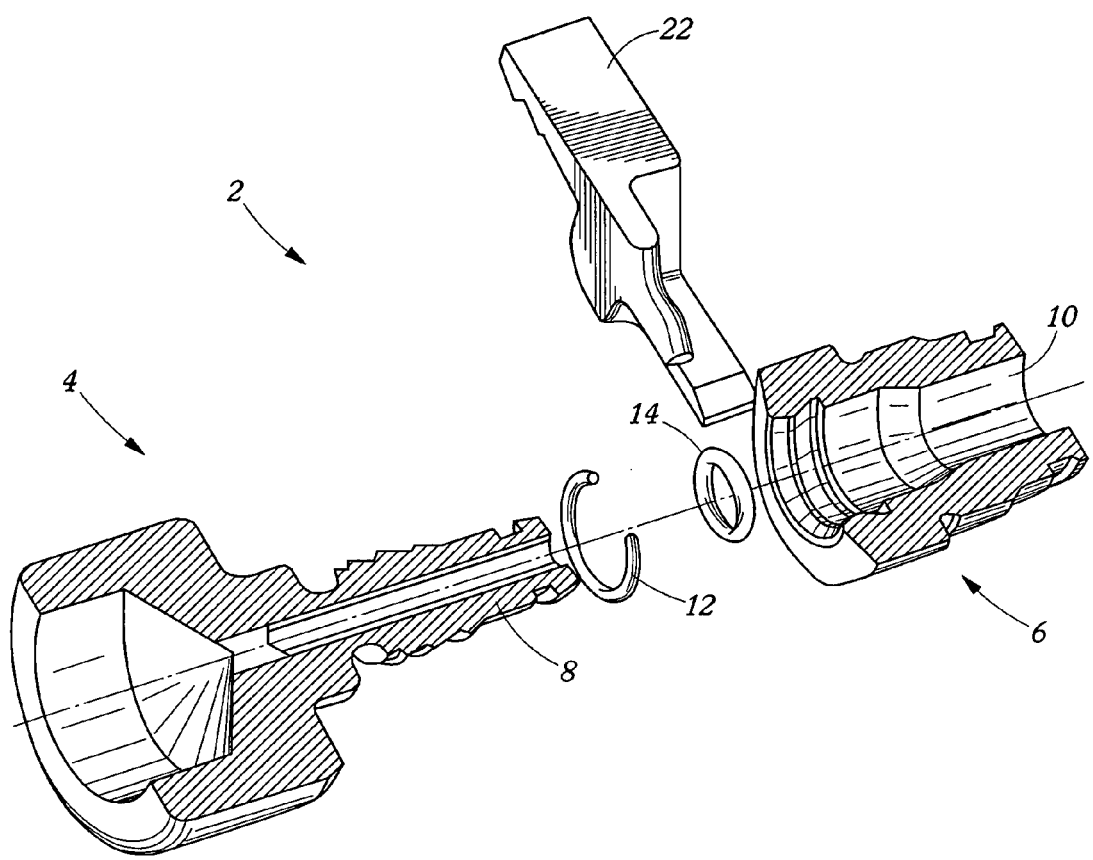
FIG. 1 is an exploded sectional perspective view of a prior art quick connect with a locking device.

To assist in the understanding of the present invention, the following list of components and associated numbering found in the drawings is provided herein:

| # | Component |
|---|---|
| 2 | Coupling |
| 3 | Locking mechanism |
| 4 | Male portion |
| 6 | Female portion |
| 8 | Stem |
| 10 | Port |
| 12 | Wedge ring |
| 13 | Ring |
| 14 | Seal |
| 16 | Angled surface |
| 18 | Locking groove |
| 20 | Mechanical locking device |
| 22 | Spacer |
| 24 | Seal groove |
| 26 | Washer |
| 28 | Collet assembly |
| 30 | Beveled surface |
| 32 | Gap |
| 34 | Spring |
| 35 | Snap ring |
| 36 | Groove |
| 37 | Elongated groove |
| 38 | Release mechanism |
| 39 | Spring |
| 40 | Lock release spacer |
| 42 | Bearing surface |

It should be understood that the drawings are not necessarily to scale. In certain instances, details which are not necessary for the understanding of the invention or which render the other details difficult to perceive may have been omitted. It should be understood, of course, that the invention is not limited to the particular embodiments illustrated herein.

DETAILED DESCRIPTION

Referring now to FIG. 1, an example of a prior art quick connect coupling 2 is shown. More specifically, hydraulic and pneumatic quick connect couplings generally include a female portion 6 that is typically a cylindrical shaped member with an inner diameter and an outer diameter such that liquids and/or gases may pass freely therethrough. Quick connects also include a male portion 4 that operably engages the female portion 6. The male portion 4 has a plurality of grooves where at least one seal 14 and/or locking device 12 may be interconnected. The outer diameter of the male portion 4 is generally less than the inner diameter of the female portion 6 of the coupling 2 to allow selective engagement and disengagement of the coupling. In order to maintain the integrity of the quick connect, a spacer 22 may be used to prevent unwanted deflection of the male portion 4 into the female portion 6. More specifically, once the wedging ring 12 is deformed, it engages a cavity in the female portion 6, thus preventing disconnection of the two portions of the coupling 2. Further insertion of the male portion 4 may cause the wedging ring 12 to return to its nominal shape, thereby allowing disengagement of the male and female portions.

Referring now to FIGS. 2-12, one embodiment of a coupling 2 of the present invention is provided that generally includes a male portion 4 that is operably interconnected with a female portion 6. More specifically, one embodiment of the present invention includes a stem 8 that fits into a port 10 to complete a flow path for the passage of pressurized fluids. Certain embodiments of the present invention also include a wedging ring 12 that is positioned around the stem 8. A flow path is provided through the male portion 4 and female portion 6 such that when pressure is introduced, a seal 14 that is used to ensure a substantially leak free connection is displaced to contact the wedge ring 12. The wedging ring 12 is then pushed against an angled surface 16 which results in the radial deformation of the wedge ring 12. When deformed, the wedging ring 12 seats inside a locking groove 18 situated in either the male portion 4 or female portion 6 of the coupling 2, thereby preventing disconnection and preferably stabilizing the coupling. This stabilization may take the form of the male portion 4 being stabilized against movement relative to the female portion 6 when the coupling is pressurized. Some embodiments of the present invention may also include a mechanical locking device 20 that is manually operated to prevent inadvertent disconnection of the male and female portions when the quick connect coupling is unpressurized.

Referring now to FIGS. 2 and 3, a detailed cross-sectional view of one embodiment of the present invention is provided. In this embodiment a seal 14 seated in a seal groove 24 is shown engaged with at least one washer 26. Adjacent to the washer 26 resides the wedging ring 12 and a second ring 13, which forms a collet assembly 28. The male portion 4 in this embodiment of the present invention also includes a locking groove 18 that is generally an annulus formed around the outer diameter of the stem 8. Upon pressurization, the seal 14 is forced to the right, as shown in FIG. 3, thus pushing the washer 26 against the wedge ring 12. The wedging ring 12 engages the second ring of the collet assembly 28, wherein each ring includes a beveled surface 30 that effectively redirects the forces imparted by the seal 14. That is, the wedging ring 12 is forced to deflect radially and decrease in diameter. The wedging ring 12 also includes a gap 32, thus allowing the wedging ring 12 to assume at least a first position and a second position. The first position is an open position, wherein there is a space between the ends of the wedging ring. The second position places the ends of the wedging ring 12 in closer proximity as a result of radial deflection of the wedge ring 12. When the wedging ring 12 is acted upon by an axial load it bears on the angled surface 16 such that outer diameter is smaller than its unpressurized outer diameter, which allows the wedging ring 12 to rest in the smaller diameter locking groove 18 provided in the male portion 4 of the coupler. Thus, the two portions cannot be removed when the coupling is pressurized. When the internal pressure of the coupling is decreased, the resilient nature of the wedging ring 12 forces it to unseat from the locking groove 18 and return to its original location as shown in FIG. 2, allowing the two sections of the quick connect to become disconnected.

Now also referring to FIG. 4, the angled surface 16 in the collet assembly 28 radially redirects the beveled surface of the wedging ring 12 in a preferred direction. The angled surface 16 may be provided by machining the seal groove 24, or alternatively, a secondary ring 13 may be provided with an angled surface to form the collet assembly 28. The latter option allows for the use of a wedging ring 12 as shown herein, with systems presently in use wherein little or no subsequent machining steps are required.

The embodiment of the present invention shown in FIG. 4 employs a seal groove 24 with an angled surface 16 machined therein, such that the second portion of the collet assembly is not required. In addition, washers are omitted in this embodiment of the present invention. However, one skilled in the art will appreciate that washers may be used to more evenly distribute the force applied from the seal 14 to the wedge ring 12. This embodiment of the present invention utilizes the same method of deforming the wedge ring 12, wherein pressure applied to the seal 14 will ultimately force the wedging ring 12 to the right. The beveled surface 30 of the wedging ring 12 will contact the angled surface 16 of the seal groove 24, thereby creating a radial force that deflects the wedging ring 12 and reduces the diameter of the wedging ring 12 to allow proper positioning into the locking groove 18.

Referring now to FIG. 5, another embodiment of the present invention is shown that employs a conical coiled spring 34 for engagement with a locking groove, wherein pressurization of the coupling pushes the seal 14 into a washer 26. The washer 26 then engages a small radius coil portion of the conical spring 34, thus pushing it against the adjacent portions thereof. This interaction of spring segments as the spring compresses axially tends to expand the outer surface of the spring 34 radially and into the locking groove of the female portion of the quick connect coupling 2. Upon reduction of pressure to a predetermined level, the spring will return to its nominal conical state, thus transitioning the outer coil of the spring from the locking groove and into the seal groove such that the male portion and the female portion of the coupling are prevented from disengagement.

Referring now to FIG. 6, an alternate embodiment of the present invention is provided. More specifically, one skilled in the art will appreciate that the locking groove 18 for receiving the wedging ring 12 may be located in the female portion 6 rather than male portion 4 without departing from the scope of the invention. This embodiment is similar to the embodiment shown in FIG. 4, wherein a pressurized seal displaces a plurality of washers 26 that interface with the wedge ring 12. The wedging ring 12 then engages an angled surface 16 of the seal groove 24 located in the male portion 4 of the coupling, thus increasing the diameter of the wedge ring 12. Again, due to the resilient nature of the wedge ring 12, the diameter will decrease and return it to its neutral position after pressure is removed.

Referring now to FIG. 7, yet another embodiment of the present invention is provided that utilizes a wedging ring collet assembly 28. This embodiment of the present invention is similar to that described above in relation to FIGS. 2 and 3, except only a single washer 26 is employed.

Figure 8:
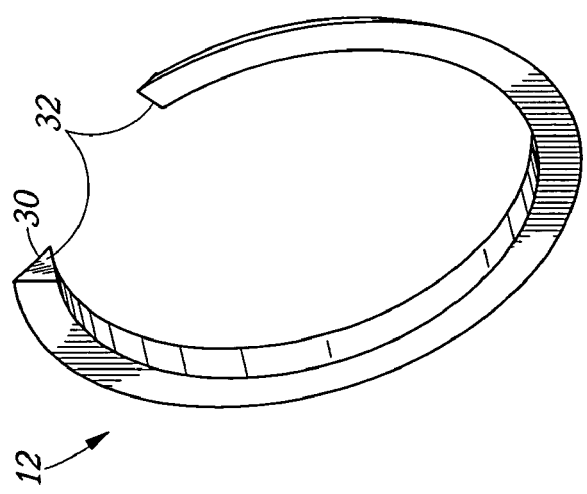
FIG. 8 is a perspective view of a wedging ring used with various embodiments of the present invention.

Referring now to FIG. 8, a wedging ring 12 in one embodiment of the present invention is provided. More specifically, wedging rings 12 are generally known in the art, and are typically non-continuous cylindrical members that may or may not include a beveled surface 30. Wedging rings 12 may be of any shape or size and have varying sizes of gaps 32 between the two end portions depending on the application. Upon deformation, the wedging ring 12 will generally decrease in diameter such that the ends of the wedging ring 12 are in close proximity when compared to a non-deformed state. Alternatively, the wedging ring 12 may be designed to increase in diameter when a pressure is applied to the coupling 2. The wedging rings 12 may be constructed of many materials, such as steel, that are resiliently deflectable, are generally non corrosive, and which accommodate many connecting and disconnecting cycles without significant wear or failure.

Referring now to FIG. 9, yet another embodiment of the present invention is depicted that utilizes an auxiliary mechanical locking mechanism 20. Generally, the auxiliary lock 20 is a cylindrical collar that engages the outside diameter of the stem 8. The lock 20 is constructed of a resilient material such that the male portion 4 may be inserted along with the lock 20 into the female portion 6. Upon insertion, the lock 20 deflects into a cavity, which in one embodiment is an elongated groove 37 situated on the outside surface of the male portion 4. Once the two portions are interconnected, the lock 20 deflects back to its neutral position and into a locking groove 36 in the female portion, thus preventing removal of the two portions. To disengage the manual lock 20, a release mechanism 38 is deflected to the right, thus engaging the lock 20 and deflecting it back into the elongated groove 37 to provide clearance between the lock 20 and the locking groove 36 of the female portion 6, thus allowing the male and female portions to be disengaged.

The embodiment of the present invention shown in FIG. 9 also includes a pressure activated locking mechanism 3 that includes a deformable wedging ring 12 that is deformed into a locking groove 18 when pressure is introduced to the system. This embodiment is advantageous since it maintains a locked interconnection between the two portions even when the coupling is not pressurized. In addition, other devices 40 may be employed to ensure that the collar is not inadvertently moved to an unlocking position, such as a spacer 40 that is placed between the release mechanism 38 and a bearing surface 42 of the female portion 6 to prevent the release mechanism collar from being moved with a spacer 40 in place. Alternatively, a spacer 40 that serves as a shroud to at least partially cover the release mechanism 38, may be used that substantially prevents a user from grasping the release mechanism with their fingers. Thus, this embodiment of the present invention provides a secondary locking feature.

Figure 10:
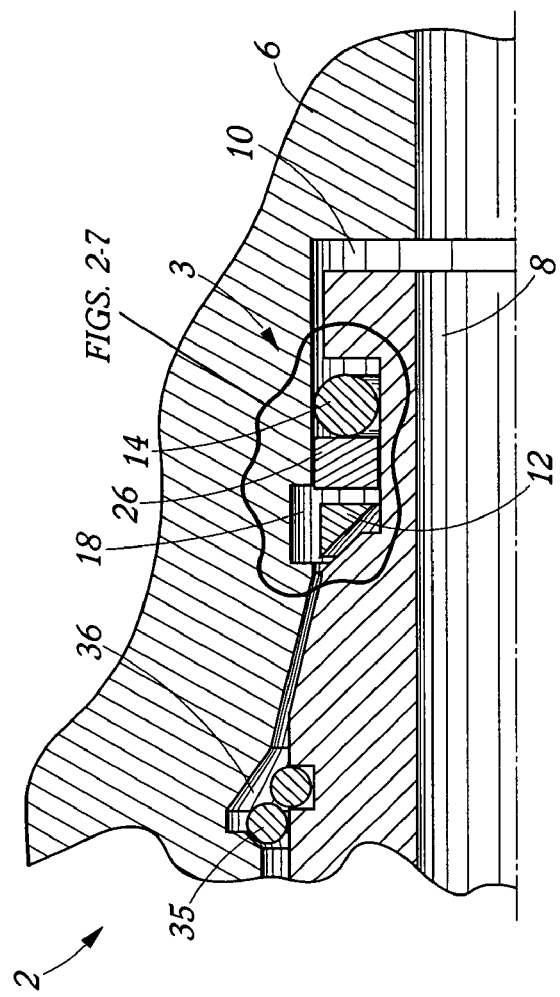
FIG. 10 is a cross-sectional front elevation view of a coupler that employs the present invention, similar to that shown in FIG. 9, with a traditional locking device of an alternate design.

Referring now to FIGS. 10-12, another embodiment of the present invention is illustrated that utilizes an additional mechanical locking mechanism, such as a snap ring 35. Generally, the wedging ring engages the outside diameter of the stem 8 and resiliently deflects into a groove 36 that is machined into the female portion of the coupling 2. Once pressure is introduced to the system, the male portion 4 and the female portion 6 of the coupling 2 will tend to separate from each other, thereby engaging the wedging ring 12 onto bearing surfaces on the male and/or female portions of the coupling 2, thus substantially preventing disengagement. Once pressure is reduced or completely removed from the system, the stem 8 may be further inserted into the female portion 6 of the coupling 2 wherein the groove 36 is located generally adjacent to the wedging ring. Further interconnection of the two portions may, in some embodiments, cause the wedging ring to be deflected into the groove such that the couplings may be disconnected. Alternatively, a release mechanism 38 as shown in FIG. 12 may be employed to physically deflect the snap ring 35 into the groove for disconnection. These embodiments of the present invention may also include a pressure activated locking mechanism 3 that includes a deformable wedging ring 12 that is deformed into a lock groove 18 when pressure is introduced to the system, as shown in FIG. 9.

Referring again to FIGS. 1-12, the locking mechanism 3 of one embodiment of the present invention is a secondary groove, or annulus, machined into either the male portion or the female portion of the quick connect opposite from the seal groove 24. In addition, a continuous wedging ring 12 of one embodiment of the present invention may be manufactured from a resilient material that may additionally have sealing properties.

Furthermore, the resilient wedging ring described herein may be referenced in the claims as a "resilient locking means". As will be appreciated by one of ordinary skill in the art, the resilient locking means is not limited to a substantially circular shaped metal ring. Alternatively, non-circular shaped "keys" which are designed to change positions or shape when a force is applied thereto would be suitable for the present invention.

With specific reference to FIG. 8, in operation, the wedging ring 12 may be engaged to the stem 8 of the male portion 4 inside the seal groove 24. As mentioned above, the wedging ring 12 is a generally non-continuous open cylinder wherein it is easily deformed and snapped into place. Further, at least one washer 26 may be provided adjacent to the wedge ring 12. Washers 26 as shown herein are generally constructed of a resilient material, such as rubber, silicone, or metal, and are incomplete rings similar to the design of a wedging ring. One skilled in the art will appreciate that washers may not necessarily be used in some embodiments of the present invention. Finally, the lubricated seal 14 deforms over the end of the stem 8 and placed inside the seal groove 24. Seals 14 of this type are generally made out of silicone, rubber, or other materials depending on the fluid and/or gas being transported through the connected coupling 2.

While various embodiments of the present invention have been described in detail, it is apparent that modifications and alterations of these embodiments will occur to those skilled in the art. However, it is to be expressly understood that such modifications and alterations are within the scope and spirit of the present invention, as set forth in the following claims.

What is claimed is:

1. A quick connect coupling with a pressure activated locking assembly, comprising:
    a male coupling having an insert;
    a female coupling having a receiver defined therein which is adapted to receive at least a portion of said insert;
    a locking cavity positioned in at least one of said male coupling and said female coupling; and
    a pressure activated locking device positioned within a recess in said at least one of said male coupling and said female coupling, said locking device operably deflecting into said locking cavity and extending beyond said recess when pressure is applied to said locking assembly by said quick connect coupling being pressurized, thereby substantially preventing disconnection of said male coupling and said female coupling.

2. The quick connect coupling of claim 1, wherein said pressure activated locking device comprises a resilient ring.

3. The quick connect coupling of claim 1, wherein said locking cavity comprises at least one angled surface in opposing relationship to said locking device.

4. The quick connect coupling of claim 1, further comprising at least one seal positioned proximate to said locking device, wherein said male coupling and said female coupling are in sealing engagement.

5. The quick connect coupling of claim 1, wherein said male coupling is stabilized relative to said female coupling when said pressure activated locking device is deflected into said locking cavity when said quick connect coupling is pressurized.

6. A pressure activated quick connect coupling locking assembly, the quick connect coupling comprising a male coupling having an insert which is adapted for engagement with a receiver of a female coupling, said locking assembly comprising:
    a resilient locking means operatively positioned substantially entirely within a recess in at least one of said male coupling and said female coupling and positioned in opposing relationship to a locking cavity, wherein when an internal pressure is applied to said locking assembly said resilient locking means changes shape to extend beyond said recess and operably engage said locking cavity, and thereby said male coupling and said female coupling are substantially prevented from disengagement, and said male coupling is stabilized against movement relative to said female coupling, until the internal pressure is released to a predetermined level.

7. The pressure activated locking assembly of claim 6, wherein said resilient locking means comprises a non-continuous wedging ring.

8. The pressure activated locking assembly of claim 7, wherein said non-continuous wedging ring is comprised of a metallic material.

9. The pressure activated locking assembly of claim 6, wherein said resilient locking means resides in the recess prior to pressurization, said recess further comprising at least one angled surface for operable engagement with at least a portion of said resilient locking means.

10. The pressure activated locking assembly of claim 6, further comprising at least one sealing ring positioned proximate to said resilient locking means to provide a seal when said male coupling and said female coupling are engaged.

11. A quick connect coupling with a pressure activated locking assembly, comprising:
a male coupling with a seal groove;
a female coupling comprising a receiver operably sized to receive said male coupling and further comprising a locking cavity integrated therein;
a resilient wedging ring adapted for positioning in said seal groove of said male coupling, said resilient wedging ring adapted to change shape from a first outer diameter to a second outer diameter when subjected to a force; and
wherein said resilient wedging ring resides substantially entirely within said seal groove of said male coupling to permit disengagement of said male coupling from said female coupling until an internal pressure is applied to the quick connect coupling, wherein said resilient wedging ring changes shape to said second diameter and extends beyond said seal groove to engage the cavity of the female coupling, wherein the male coupling and the female coupling are substantially locked together until the pressure on said quick connect coupling is decreased to a predetermined level.

12. The quick connect coupling of claim 11, wherein said seal groove of the male coupling includes an angled surface for engagement with said resilient wedging ring.

13. The quick connect coupling of claim 11, wherein the substantial locking together of the male coupling and the female coupling stabilizes the quick connect coupling.

14. The quick connect coupling of claim 13, wherein the stabilization comprises said male coupling being stabilized against movement relative to said female coupling when said resilient wedging ring engages the cavity of the female coupling when internal pressure is applied to the quick connect coupling.

15. The quick connect coupling of claim 11, wherein said resilient wedging ring is consisting of at least one of an aluminum, a steel, a fiberglass, and a plastic.

16. The quick connect coupling of claim 11, further comprising a secondary locking device interconnected to a portion of said male coupling, wherein said male coupling is prevented from disengagement from said female coupling until said secondary locking device is disengaged from said female coupling.

17. The quick connect coupling of claim 16, wherein said secondary locking device comprises a resiliently deflectable lock situated about said male coupling for engagement in an auxiliary locking groove integrated into said female coupling.

18. The quick connect coupling of claim 16, further comprising a spacer positioned between a release mechanism of said secondary locking device and said female coupling, wherein said release mechanism is restricted from travel until said spacer is removed.

19. The quick connect coupling of claim 18, wherein said spacer comprises a partially concentric ring.

20. The quick connect coupling of claim 18, wherein said spacer further comprises a handle portion which is adapted for grasping by a user's fingers.

21. The quick connect coupling of claim 18, wherein said spacer at least partially shrouds said release mechanism, wherein a user is substantially restricted from grasping said release mechanism.

* * * * *